United States Patent [19]

Nakate et al.

[11] Patent Number: 4,523,072
[45] Date of Patent: Jun. 11, 1985

[54] PRODUCTION OF ELECTRICAL RESISTANCE WELDED STEEL TUBES WITH WELDS HAVING IMPROVED TOUGHNESS

[75] Inventors: Hiroshi Nakate; Masatoshi Kondo; Nobuyuki Gosho, all of Wakayama, Japan

[73] Assignee: Sumitomo Metal Industries, Ltd., Osaka, Japan

[21] Appl. No.: 528,782

[22] Filed: Sep. 2, 1983

[30] Foreign Application Priority Data

Sep. 4, 1982 [JP] Japan ............................ 57-154225
Sep. 4, 1982 [JP] Japan ............................ 57-154226

[51] Int. Cl.³ .................................. B23K 11/08
[52] U.S. Cl. ................................. 219/67; 219/59.1
[58] Field of Search ............... 219/59.1, 61.7, 67, 219/9.5; 148/127

[56] References Cited

U.S. PATENT DOCUMENTS 2,976,394  3/1961  Sönnichsen ................... 219/59.1
4,062,705 12/1977  Gondo et al. ................. 148/127

FOREIGN PATENT DOCUMENTS 10220   1/1979  Japan ........................... 148/127
35636   2/1982  Japan ........................... 148/127
76124   5/1982  Japan ........................... 148/127
703584 12/1979  U.S.S.R. ....................... 148/127

*Primary Examiner*—Philip H. Leung
*Assistant Examiner*—Catherine M. Sigda
*Attorney, Agent, or Firm*—Burns, Doane, Swecker & Mathis

[57] ABSTRACT

A process for producing an ERW tube having welds which have been improved in toughness without adversely affecting the toughness of the parent metal of the tube is disclosed. The process comprises forming a continuous low alloy steel strip into a tubular shape through a series of forming rolls, continuously carrying out electrical resistance welding of a seam which is formed from the opposite side edges of the hoop and which extends in the longitudinal direction to produce an electrical resistance welded tube, heating the welds of the thus obtained electrical seam welded tube to a temperature not lower than the $A_{c3}$ point, then cooling the heated welds at cooling rate of 15°–30° C./sec for at least between 800° C. and the $A_{r1}$ point, and tempering the thus cooled welds of the tube at a temperature of 450°–800° C.

15 Claims, 5 Drawing Figures

PRODUCTION OF ELECTRICAL RESISTANCE WELDED STEEL TUBES WITH WELDS HAVING IMPROVED TOUGHNESS

BACKGROUND OF THE INVENTION

This invention relates to a process for producing electrical resistance welded low alloy steel tubes, and especially for producing tubes provided with welds having improved toughness.

In the conventional method, a continuous steel strip is formed through a series of forming rolls into a tubular shape having a longitudinally extending seam, and the thus formed seam is then subjected to electrical resistance welding so as to produce a continuous tube called an "electrical resistance welded tube" (hereunder sometimes referred to as "ERW" tube). The ERW tube thus produced is then drawn to some extent with a sizer in order to adjust its roundness within a limited tolerance. Since the ERW tube may be highly efficiently manufactured and is of good quality, it has been widely used for a variety of applications as less expensive steel tube.

However, heat input for welding in high frequency electrical resistance welding is rather small, and the cooling rate of the welds is relatively high in comparison with that in other welding methods. Therefore, in a low alloy steel tube containing a relatively large amount of alloying elements, the area adjacent to the welds turns into a hardened structure upon cooling, resulting in degradation of its low temperature toughness and corrosion resistance.

In order to soften the hardened structure in the area adjacent to the welds, high frequency induction heating is applied immediately after the welding so as to heat the area adjacent to the welds to effect normalizing or annealing. This heat treatment is called "seam normalizing" or "seam annealing".

This heat treatment has the following advantages:

(1) Since the heat treatment can be carried out in a continuous production line for manufacturing tubes, it can be carried out efficiently without interrupting the continuous production of the ERW tubes;

(2) Heat treatment is applied only to a limited area adjacent to the welds, making the heat treatment less expensive; and (3) Sizing with a sizer may be carried out after heat treatment, and an ERW tube can be manufactured within closer tolerances.

However, it also has the following disadvantages:

(1) When the distance between the surface of the tube to be heated and a high frequency induction heating coil is varied, the density of the induced current is also varied, resulting in fluctuation in heating temperatures. So it is quite difficult to precisely control the heating temperature, since fluctuation in the induced current density is unavoidable. Therefore, it is necessary to previously set the heating temperature at a level higher than the target heating temperature. In addition, when high frequency induction heating is employed, it is unavoidable that the current density of the induced current in the outer surface of the tube is higher than that in the inner surface of the tube, resulting in the heating of the outer surface to a temperature higher than the inner surface. The difference in temperature between the outer surface and inner surface sometimes reaches about 200° C. or more. This means that the heating temperature of the outer surface inevitably comes to a temperature about 200° C. higher than the target value. Such high temperatures sometimes cause the formation of coarse austenitic crystal grains. Improvement in toughness cannot be expected; and (2) The welds have oxides of Si, Mn etc., which have been formed during heating and which extend in the radial direction of the tube when it is upset, i.e. when subjected to sizing. Such extended oxides in the radial direction impair toughness of the welds.

Therefore, it has been thought that ERW tubes have poor toughness in their welds, and they cannot be used in applications in which improved toughness is required.

A method in which the whole of the ERW tube is subjected to quenching and tempering has been proposed so as to improve the toughness of the tube. However, this method cannot produce ERW tubes within close tolerances and is much expensive because this method requires the additional heat treatments. These disadvantages offset the advantages which can be obtained by employing electrical resistance welding.

SUMMARY OF THE INVENTION

Thus, an object of the present invention is to provide a method of producing ERW tubes of low alloy steel at a relatively low cost which have welds with excellent toughness.

Another object of the present invention is to provide a method of producing ERW tubes of low alloy steel, the welds of which do not develop strain concentrations during sizing.

According to the experience of the inventors of the present invention, the toughness of the welds of ERW tubes markedly deteriorates after the tubes are subjected to sizing. The inventors of the present invention found, after intensive study of the toughness of the welds, that such degradation in toughness is caused by the formation of coarse crystal grains which is most significant in areas near the welds because of low carbon content in these areas. Furthermore, since the hardness of the welds is low in comparison with the hardness of the surrounding areas, strain is concentrated in the welds during sizing, causing plastic forming of the welds. The occurrence of plastic forming of the welds brings about a degradation in toughness.

Thus, the present invention is based on the findings mentioned above. According to the present invention, the welds are heated to a temperature higher than the Ac$_3$ point by means of conventional induction heating. Then, heated welds are cooled at a specified cooling rate so as to provide a structure comprising a fine ferritic phase partially in admixture with a bainitic phase. Such a mixed structure ensures that the hardness of the welds is not lower than that of the surrounding areas, so that sizing can be carried out without producing degradation in the toughness of the welds.

Thus, according to the present invention, not only improved toughness of the welds, but also a very strong matrix can be obtained due to the formation of a fine ferritic phase.

In addition, although a partially formed bainitic phase consists of fine grains and the toughness of the as-precipitated structure is not satisfactory, the application of tempering to the welds comprising these fine bainitic grains improves the toughness. Due to a high degree of toughness and strength, strain concentrations do not occur even when sizing with a sizer is performed.

Thus, according to the present invention, a satisfactory level of toughness can be maintained even after sizing.

It is to be noted that according to the present invention, since the temperature at which tempering is carried out is rather low and deformation during tempering is very small, tempering may be performed either on the welds only or on the whole of the tube. Tempering performed on the whole of the tube is advantageous when the T/D ratio of the ERW tube is large, since degradation in toughness of the parent metal caused by work hardening can be recovered, and moreover the toughness of the parent metal can be further improved by the tempering. In addition, since tempering does not bring about any transformation of structure, the original dimension and shape can be maintained even if local tempering is performed immediately after sizing. This means that tempering may be carried out at any point during the manufacture. In view of cost, efficiency, and dimensional accuracy, it is preferable to carry out the tempering before sizing.

In summary, the present invention resides in a process for producing ERW tubes having welds which have been improved in toughness without adversely affecting the toughness of the parent metal. The process comprises forming a continuous low alloy steel strip into a tubular shape through a series of forming rolls, continuously carrying out electrical resistance welding of a seam formed from the opposite side edges of the strip and which extends in the longitudinal direction to produce an electrical resistance welded tube, heating the welds of the electrical resistance welded tube thus obtained to a temperature not lower than the $A_{c3}$ point, cooling the heated welds at a cooling rate of 15°–30° C./sec for at least between 800° C. and the $A_{r1}$ point, and tempering the cooled welds or the whole of the tube at a temperature of 450°–800° C., preferably 500° - $A_{c1}$ point.

In a preferred embodiment, the low alloy steel strip which is employed for manufacturing the ERW tubes in the present invention comprises a steel having essentially the following composition by weight:

> C: 0.03–0.15%, Si: not more than 0.50%
> Mn: 0.60–1.60%, sol.Al: 0.005–0.070%,
> optionally at least one of Nb: 0.005–0.060%,
> Ti: 0.005–0.060% and V: 0.01–0.10%, and
> the balance iron and incidental impurities.

Thus, according to the present invention, when the tempering is applied to the whole of the tube, an ERW tube in which not only the toughness of the welds, but also the toughness of the parent metal have been improved markedly can be manufactured.

In one embodiment of the present invention, the process for producing the ERW tubes comprises forming a continuous low alloy steel strip into a tubular form through a series of forming rolls, continuously carrying out electrical resistance welding of a seam which is formed from the opposite side edges of the strip and which extends in the longitudinal direction to produce an electrical resistance welded tube, heating the welds of the electrical resistance welded tube thus obtained to a temperature not lower than the $A_{c3}$ point, cooling the heated welds at a cooling rate of 15°–30° C./sec for at least between 800° C. and the $A_{r1}$ point, tempering the welds or the whole of the tube by heating the welds or the whole of the tube at a temperature of 450°–800° C., preferably 500° - $A_{c1}$ point, and performing compressive forming on the ERW tube by means of a sizer.

In another embodiment of the present invention, the above mentioned compressive forming with a sizer may be performed before tempering, although compressive forming after tempering is preferred when close tolerances are desired. When the sizing is performed after the tempering, it is preferable to effect the tempering at a low temprature, e.g. at a temperature of 500°–750° C., preferably 500°–650° C. in order to produce welds stronger than the parent metal.

DETAILED DESCRIPTION OF PREFERRED EMBODIMENTS

This invention will be further described in conjunction with the accompanying drawings.

According to the present invention, a continuous low alloy steel strip is successively formed into a tubular shape through a series of forming rolls in a tube-forming line. After being subjected to electrical resistance welding, heat treatment including forced cooling and sizing are carried out and the ERW tubes thus manufactured are cut into suitable lengths, if necessary. As mentioned hereinbefore, tempering may be performed only on the welds and their adjacent areas either before or after sizing. Alternatively, tempering may be performed on the whole of the tube after the ERW tube thus obtained is cut into suitable lengths.

Figure 1:
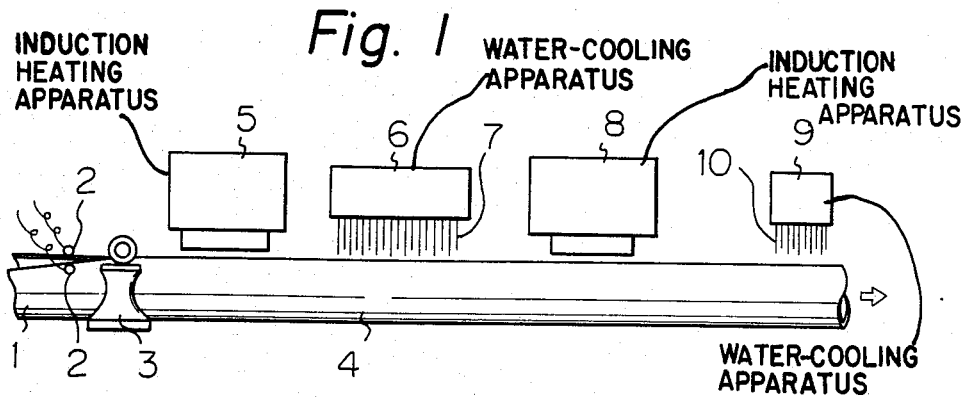
FIG. 1 is a schematic view illustrating a welding and heat treating line in which the process of the present invention can be carried out.

As shown in FIG. 1, a continuous low alloy steel strip 1 is formed into a tubular shape through a series of forming rolls (not shown) and the successively formed steel strip 1 has a longitudinal seam formed from the opposite side edges of the hoop. The seam is welded by means of applying an electrical current through a pair of electrodes 2,2 to heat the seam. A pair of squeeze rolls 3,3 bring the opposite edges into contact with each other and form a seam-welded tube 4. The welds of the seam-welded tube 4 are then heated by means of an induction heating apparatus 5 in which the welds are heated to a temperature not lower than the $A_{c3}$ point. After heating, the welds are cooled at a cooling rate of 15°–30° C./sec for at least between 800° C. and the $A_{r1}$ point by the application of a water shower 7 from a water-cooling apparatus 6.

When it is necessary to temper the whole of the tube, the tube is conveyed to a heating furnace (not shown) to effect the heat treatment of the whole of the tube, preferably after it is cut into suitable lengths. On the other hand, when only the welds are tempered, as shown in FIG. 1, the welds are reheated by means of an induction heating apparatus 8 in the succeeding production line, and then are air-cooled. Upon being cooled to a predetermined temperature, the welds are cooled by means of water shower 10 supplied from a water-cooling apparatus 9.

The reasons for defining the steel composition of a steel strip, heating temperature range, rapid-cooling temperature range, cooling rates and tempering temperature range for welds as in the above description are as follows.

(1) A low alloy steel strip employed in this invention has the following steel composition which consists essentially of, by weight:

C: 0.03-0.15%, Si: not more than 0.50%
Mn: 0.60-1.60%, sol.Al: 0.005-0.070%,
optionally at least one of Nb: 0.005-0.060%,
Ti: 0.005-0.060% and V: 0.01-0.10%, and
the balance iron and incidental impurities.

The steel composition in the above is defined for the following reasons:

C:

When C is less than 0.03%, the steel is not hardened and benefits produced by fine grains can not be expected. When C is more than 0.15%, toughness deteriorates.

Si:

When more than 0.50% of Si is present in steel, Si adversely affects the toughness.

Mn:

It is necessary to add Mn in an amount of not less than 0.60% so as to secure a sufficient level of strength and toughness. However, when Mn is more than 1.60%, the formation of coarse bainitic grains becomes so marked that the toughness of the steel deteriorates. The upper limit for Mn is therefore 1.60%.

sol.Al:

Al is added as a deoxidant. When it is added excessively, the precipitation of inclusions increases, resulting in a decrease in toughness. Therefore, according to the present invention, Al in an amount of 0.005-0.070% is added.

Nb, Ti, V:

These elements are optionally added so as to secure a high level of strength. For this purpose, at least one of these elements is added in amounts of 0.005-0.060%, 0.005-0.060%, and 0.01-0.10%, respectively.

(2) Heating to the $A_{c3}$ point or higher:

The structure of the welds of an as-welded ERW tube is unavoidablly hardened due to air cooling after welding. Therefore, it is necessary to heat the welds to the $A_{c3}$ point or to a temperature higher than the $A_{c3}$ point so as to eliminate the hardened structure by forming an austenitic structure.

The heating is applied to the outer surface of the tube with a rapid heating means, such as an induction heating means. However, when induction heating is employed, the temperature of the outer surface of the tube is usually higher than that of the inner surface of the tube. In addition, the temperature difference between the outer and inner surfaces during induction heating is dependent on the frequency employed. The higher the frequency, the larger the difference. Therefore, it is necessary to consider the frequency of the electrical current employed when a target value for the heating temperature is set. An excessively high temperature is not desirable because the higher the heating temperature, the coarser the crystal grains, resulting in a decrease in toughness. It is therefore desirable that the welds are heated to a temperature within the range between the $A_{c3}$ point and a temperature 200° C. higher than the $A_{c3}$ point.

(3) Forced cooling:

Forced cooling after heating to the $A_{c3}$ point or higher is carried out in order that the crystal growth of austenitic grains is suppressed and precipitation of fine ferritic grains is promoted.

The cooling should start from as high a temperature as possible. In particular, since the precipitation of a ferritic phase occurs at a temperature lower than 800° C., it is necessary to set the starting point at a temperature not lower than 800° C. in order to precipitate fine ferritic grains.

The production of the ERW tubes is carried out by forming and welding a steel strip at high speed in a continuous production line. It is preferable to employ high speed local heating in order to achieve a continuous tube-manufacturing line. For this purpose, the employment of high frequency induction heating is advisable. However, in case high frequency induction heating is employed to locally heat the welds, the outer surface is heated to a relatively high temperature, the crystal grains become coarse while there is a tendency for the crystal grains including ferritic ones to become fine in the inner surface area, because the temperature of the inner surface is low and heating takes place rapidly. Thus, welds containing fine ferritic grains throughout the structure can be obtained by applying forced cooling to the outer surface.

However, if the forced cooling is stopped at a point higher than the $A_{r1}$ point, coarse ferrite grains are precipitated resulting in a degradation in toughness. Thus, according to the present invention, the forced cooling is carried out over a temperature range of at least from 800° C. to the $A_{r1}$ point.

The finishing point for the forced cooling is preferably as high as possible so long as the finishing preint is not higher than the $A_{r1}$ point in order that an additional heating step can be saved in the following tempering step. A high finishing point is preferable from the viewpoint of saving energy.

(4) Cooling rate:

When the cooling rate is smaller than 15° C./sec during forced cooling, the crystal grains grow coarse and the intended properties cannot be obtained. It is quite difficult to employ high pressure water in order to cool the welds in an actual production line for ERW tubes, and the highest cooling rate achievable by conventional method is 30° C./sec. Therefore, the present invention defines the cooling rate as 15°-30° C./sec. It is to be noted that when a higher cooling rate is employed to form a martensite structure which is thereafter tempered, the same effect can be obtained. However, it is not desirable to locally transform the structure of the welds into martensite, since such local formation of martensite results in warping of the tube.

(5) Tempering temperature:

Since as-cooled welds have high hardness and poor toughness, it is necessary to temper the welds. Therefore, according to this invention, the tempering may be performed on the welds or on the whole of the tube, including the welds. Ease of temperature control or operation will determine which is more appropriate under given circumstances. When the tempering temperature is lower than 450° C., the improvement in weld toughenss is low. On the other hand, when the temperature goes above the $A_{c1}$ temperature, the structure of the welds is austenitic, and when it goes up beyond 800°

C., the austenitic crystal grains grow coarse, resulting in a deterioration in toughness. Therefore, the temperature for tempering is from 450° C. to 800° C., and preferably between 500° C. and the $A_{c1}$ point.

As is apparent from the foregoing, according to the present invention, tempering of the welds or the whole of the ERW tube including the welds may be carried out in a continuous manner in the succeeding production line. Alternatively, the tempering may be performed off the prduction line after the continuous tube is cut into suitable lengths. In the former case, the tempering may be performed immediately after the heating to the $A_{c3}$ point and forced cooling.

(6) Sizer Compressive forming:

Compressive forming with a sizer may be carried out after completion of the tempering treatment, or it may be applied after forced cooling and followed by the tempering treatment. Usually, the sizing ratio may be 3% or less. The sizer used in the present invention may be the one conventional in the art.

When the sizer compressive forming is carried out after completion of tempering, it is desirable that the tempering be carried out at a low temperature, generally at a temperature of 500°–700° C., preferably 500°–650° C. In either case, the tempering may be performed on the welds only or to the whole of the tube including the welds.

The present invention will be described further in conjunction with two working examples, which are presented merely for illustrative purposes.

EXAMPLE 1

According to the conventional manner, a series of low alloy steel strips having chemical compositions (designated as Steel A through Steel D) shown in Table 1 were prepared.

The resulting steel strips were successively formed into tubes in an ERW tube production line, and electrical resistance welding and heat treatment were carried out with the apparatus schematically shown in FIG. 1 to produce ERW tubes 406.4 mm in outer diameter and 12.7 mm in thickness. The heat treatment conditions employed in this example are summarized in Table 2. Tempering was performed on the whole of the tube in this example, so the ERW tubes were recovered from the production line after being subjected to forced cooling with a shower 7 (see FIG. 1).

Test pieces were cut from the welds of the thus produced ERW tubes of Steel A through Steel D and were used to determine Charpy impact values at −20° C. ($vE_{-20° C.}$). The test results are summarized in the graph of FIG. 2.

Figure 5:
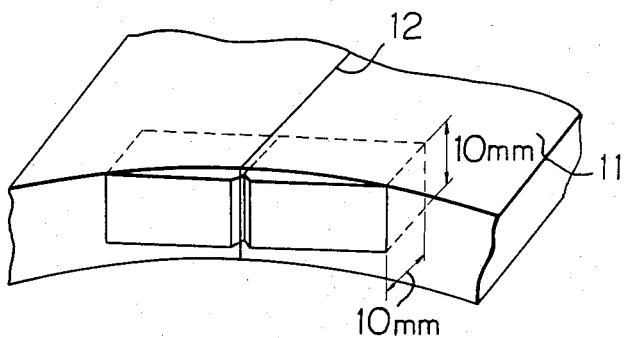
FIG. 5 is a schematic view illustrating the location where test pieces for Charpy impact tests were cut.

The dimensions of the test pieces were 10×10 mm with a 2 mm V-shaped notch. The location from which the test pieces were cut is shown in FIG. 5. The center of the notch of each test piece was coincided with the center of the welds 12 of the ERW tube 11.

The ERW tubes composed of Steels A and B of Table 1 were subjected to either heat treatment No. 4 (heat treatment according to the present invention) or heat treatment No. 5 (comparative heat treatment) and were then subjected to drawing with a sizer (sizing ratio of 0.5%). Reduction in Charpy impact values was determined by comparing Charpy impact values before and after the sizing. The test results are summarized in FIG. 3.

As is apparent from the graphs, according to the present invention, for both Steels A and B, the reduction in Charpy impact values (the difference between the values before sizing and after sizing) is markedly small.

TABLE 1

| | Chemical Composition (% by weight) | | | | | | | | | |
|---|---|---|---|---|---|---|---|---|---|---|
| Steel | C | Si | Mn | P | S | Nb | Ti | V | sol.Al | Fe + impurities |
| A | 0.10 | 0.10 | 0.97 | 0.014 | 0.005 | — | — | — | 0.038 | bal. |
| B | 0.08 | 0.12 | 1.01 | 0.016 | 0.006 | — | 0.047 | — | 0.035 | " |
| C | 0.08 | 0.20 | 1.08 | 0.017 | 0.004 | 0.028 | 0.032 | — | 0.042 | " |
| D | 0.07 | 0.18 | 1.33 | 0.014 | 0.002 | 0.044 | 0.040 | 0.02 | 0.040 | " |

TABLE 2

| Heat treatment No. | | Heating temp. (°C.) | Water cooling initiating temp. (°C.) | Cooling rate (°C./sec) | Water cooling finishing temp. (°C.) | Tempering temp. (°C.) |
|---|---|---|---|---|---|---|
| Present Invention | 1 | 950 | 850 | 15 | 500 | 650 |
| | 2 | 950 | 850 | 15 | 500 | 500 |
| | 3 | 950 | 850 | 20 | 400 | 750 |
| | 4 | 950 | 850 | 30 | 250 | 650 |
| Comparative | 5 | 950 | air cooling | | | no tempering |
| | 6 | as welded | | | | no tempering |

EXAMPLE 2

This example was almost identical to Example 1 except that tempering after welding was performed only on the weld area as shown in FIG. 1. Heating conditions are summarized in Table 3. The test results are summarized in FIG. 4. The heating temperature at the second stage referred to in Table 3 means the tempering temperature.

Figure 2:
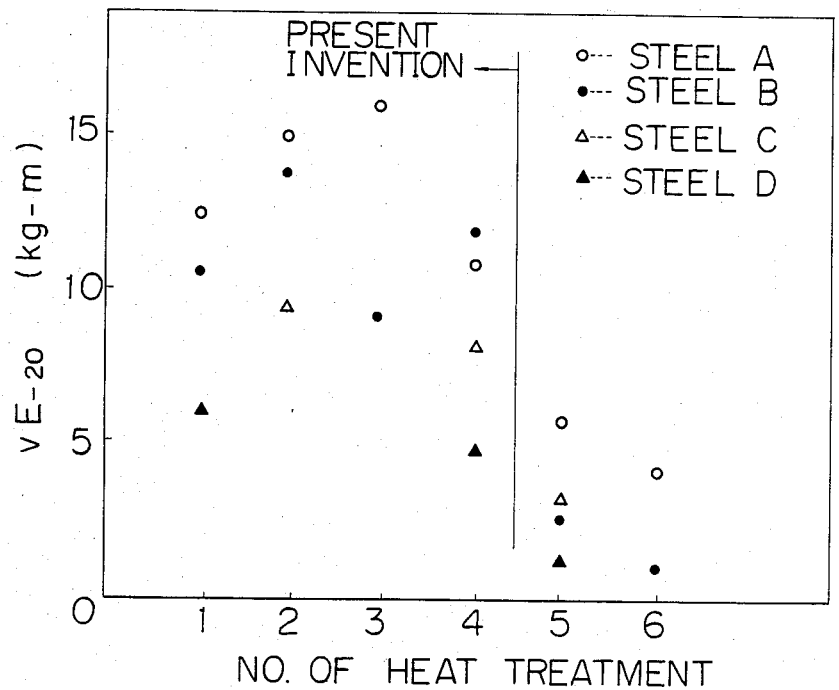
FIGS. 2 through 4 are graphical illustrations showing the toughness properties of the welds of ERW tubes with respect to the type of steel and heat treatment conditions.
Figure 3:
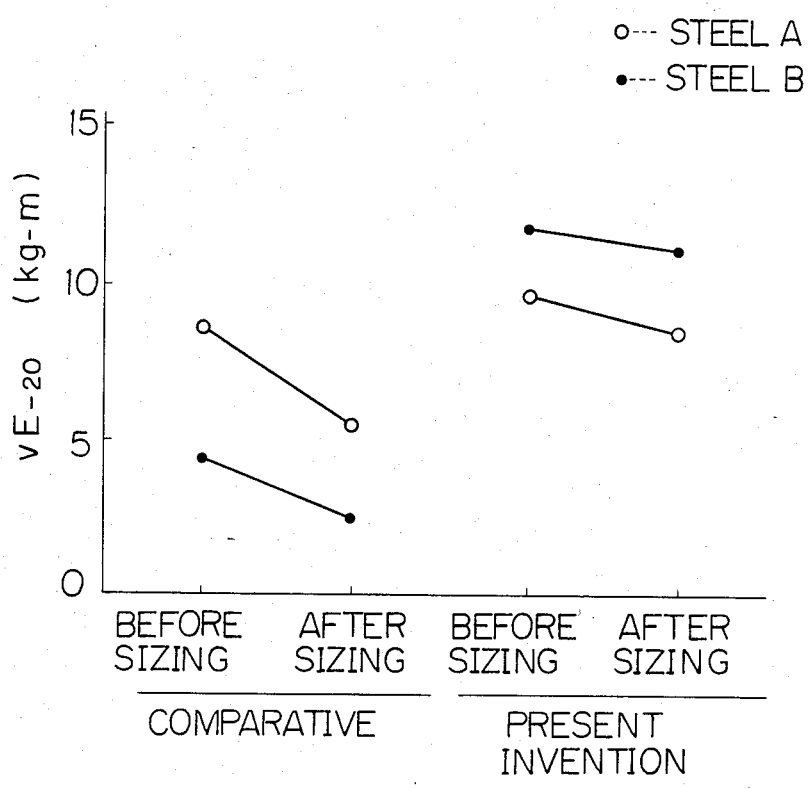
Figure 4:
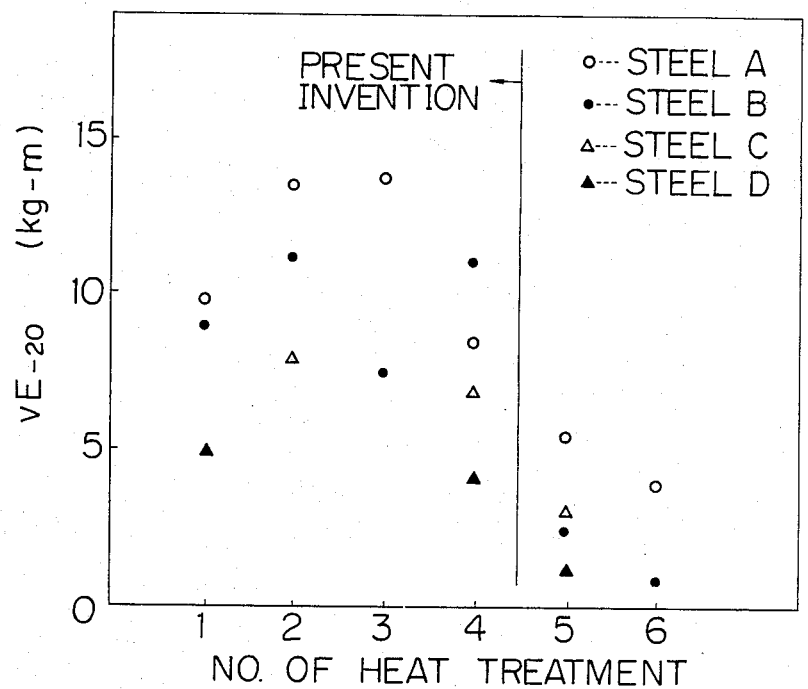

As apparent from FIGS. 2 through 4, according to the process of the present invention, a satisfactory ERW tube can be obtained with improvement in the toughness of the welds even after forming with a sizer.

From the foregoing, it should be clear that the method according to the present invention enables the manufacture at a lower cost of low alloy ERW tubes, the welds of which have satisfactory toughness even after compressive forming with a sizer.

TABLE 3

| Heat treatment No. | | Heating temp. at first stage (°C.) | Water cooling initiating temp. (°C.) | Cooling rate (°C./sec) | Water cooling finishing temp. (°C.) | Heating temp. at second stage (°C.) | Water cooling initiating temp. (°C.) |
|---|---|---|---|---|---|---|---|
| Present Invention | 1 | 950 | 850 | 15 | 500 | 650 | 550 |
| | 2 | 950 | 850 | 30 | 250 | 650 | 550 |
| | 3 | 950 | 850 | 20 | 400 | 750 | 640 |
| | 4 | 950 | 850 | 20 | 400 | 550 | 470 |
| Comparative | 5 | 950 | | air cooling | | | 550 |
| | 6 | | | as-welded | | | |

What is claimed is:

1. A process for producing an ERW tube having welds which have been improved in toughness without adversely affecting the toughness of the parent metal of the tube, which comprises forming a continuous low alloy steel strip into a tubular shape through a series of forming rolls, continuously carrying out electrical resistance welding of a seam which is formed from opposite side edges of the strip and which extends in a longitudinal direction to produce an electrical resistance welded tube, heating the welds of the thus obtained electrical resistance welded tube to a temperature not lower than the $A_{c3}$ point, then cooling the heated welds at cooling rate of 15°–30° C./sec at least between 800° C. and the $A_{r1}$ point to obtain a metallurgical structure of bainite plus fine ferrite, and tempering the thus cooled welds of the tube at a temperature of 450°–800° C.

2. A process as defined in claim 1, in which the tempering is performed on the whole of the tube.

3. A process as defined in claim 2, in which the tempering is carried out at a temperature of 500° C. - the $A_{c1}$ point.

4. A process as defined in claim 1, in which the tempering is carried out at a temperature of 500° C. - the $A_{c1}$ point.

5. A process as defined in claim 1, in which the low alloy steel has a steel composition which consists essentially of, by weight:

| | |
|---|---|
| C: 0.03–0.15%, | Si: not more than 0.50% |
| Mn: 0.60–1.60%, | sol.Al: 0.005–0.070%, |
| optionally at least one of Nb: 0.005–0.060%, | |
| Ti: 0.005–0.060% and V: 0.01–0.10%, and | |
| the balance iron and incidental impurities. | |

6. A process for producing an ERW tube, which comprises forming a continuous low alloy steel strip into a tubular shape through a series of forming rolls, continuously carrying out electrical resistance welding of a seam which is formed from opposite side edges of the strip and which extends in a longitudinal direction to produce an electrical resistance welded tube, heating the welds of the thus obtained electrical resistance welded tube to a temperature not lower than the $A_{c3}$ point, then cooling the heated welds at a cooling rate of 15°–30° C./sec at least between 800° C. and the $A_{r1}$ point to obtain a metallurgical structure of bainite plus fine ferrite, tempering the welds of the tube by heating the welds at a temperature of 450°–800° C., and performing compressive forming on the thus tempered tube by means of a sizer.

7. A process as defined in claim 6, in which the tempering is performed on the whole of the tube.

8. A process as defined in claim 7, in which the tempering is carried out at a temperature of 500° C. - the $A_{c1}$ point.

9. A process as defined in claim 6, in which the tempering is carried out at a temperature of 500° C. - the $A_{c1}$ point.

10. A process as defined in claim 6, in which the low alloy steel has a steel composition which consists essentially of, by weight:

| | |
|---|---|
| C: 0.03–0.15%, | Si: not more than 0.50% |
| Mn: 0.60–1.60%, | sol.Al: 0.005–0.070%, |
| optionally at least one of Nb: 0.005–0.060%, | |
| Ti: 0.005–0.060% and V: 0.01–0.10%, and | |
| the balance iron and incidental impurities. | |

11. A process for producing an ERW tube, which comprises forming a continuous low alloy steel strip into a tubular shape through a series of forming rolls, continuously carrying out electrical resistance welding of a seam which is formed from opposite side edges of the strip and which extends in a longitudinal direction to produce an electrical resistance welded tube, heating the welds of the thus obtained electrical resistance welded tube to a temperature not lower than the $A_{c3}$ point, then cooling the heated welds at a cooling rate of 15°–30° C./sec at least between 800° C. and the $A_{r1}$ point to obtain a metallurgical structure of bainite plus fine ferrite, performing compressive forming on the thus cooled tube by means of a sizer, and tempering the welds of the tube by heating the welds at a temperature of 450°–800° C.

12. A process as defined in claim 11, in which the tempering is performed on the whole of the tube.

13. A process as defined in claim 12, in which the tempering is carried out at a temperature of 500° C. - the $A_{c1}$ point.

14. A process as defined in claim 11, in which the tempering is carried out at a temperature of 500° C. - the $A_{c1}$ point.

15. A process as defined in claim 11, in which the low alloy steel has a steel composition which consists essentially of, by weight:

| | |
|---|---|
| C: 0.03–0.15%, | Si: not more than 0.50% |
| Mn: 0.60–1.60%, | sol.Al: 0.005–0.070%, |
| optionally at least one of Nb: 0.005–0.060%, | |
| Ti: 0.005–0.060% and V: 0.01–0.10%, and | |
| the balance iron and incidental impurities. | |

* * * * *